United States Patent [19]

Talkington

[11] 4,008,606
[45] Feb. 22, 1977

[54] SHIP'S BOTTOM INSPECTION APPARATUS

[75] Inventor: Howard R. Talkington, La Jolla, Calif.

[73] Assignee: The United States of America as represented by the Secretary of the Navy, Washington, D.C.

[22] Filed: Oct. 20, 1975

[21] Appl. No.: 623,858

[52] U.S. Cl. .............................. 73/104; 73/432 R; 240/2 C; 354/64; 354/81
[51] Int. Cl.² .................. G01N 19/02; G03B 29/00
[58] Field of Search ........................ 73/104, 432 R; 114/221 R, 222; 240/2 C, 2.18, 26; 354/64, 68, 69, 73, 81, 127, 294

[56] References Cited

UNITED STATES PATENTS

| 685,463 | 10/1901 | Walkins | 354/64 |
| 3,596,082 | 7/1971 | Doret et al. | 240/26 |
| 3,738,248 | 6/1973 | Fish et al. | 354/64 |

Primary Examiner—Richard C. Queisser
Assistant Examiner—John S. Appleman
Attorney, Agent, or Firm—Richard S. Sciascia; Ervin F. Johnston

[57] ABSTRACT

A ship's bottom inspection apparatus which includes a generally U-shaped framework which is adapted to be submerged for receiving the width of a ship therebetween. A series of cameras are mounted in a spaced relationship along the framework to view vertically upward. A series of lights are mounted in a spaced relationship along the framework at an acute angle to vertical and directed generally toward the viewing area of the cameras so that backscattering is minimized while ship bottom discontinuities are made evident by shadow effects. In this manner multiple photographs can be taken of the ship's bottom to display any possible structural defects.

10 Claims, 4 Drawing Figures

SHIP'S BOTTOM INSPECTION APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

One of the purposes of dry-docking ships is to inspect the ships bottoms for cracks which may lead to structural failures. The dry-docking also enables inspection for anti-fouling protection, corrosion, and extent of biological growth. This routine procedure has not been feasible with very large ships, such as aircraft carriers and super tankers, because of the lack of dry-docks which are large enough to receive such ships. The few very large dry-docks are used steadily for new construction, and therefore are not readily available for inspection purposes. This is unfortunate since the very large new ships are pushing the state-of-the-art structural design and should have regular inspection to ensure their structural integrity. An unfortunate incident was the loss of two super tankers which broke up in 1974 due to a storm in the South Pacific. Possibly a routine inspection would have disclosed a structural defect in these ships which could have been corrected to avoid the tragic result. Consequently, these large new ships should be inspected even more frequently than the smaller ships.

SUMMARY OF THE INVENTION

The present invention provides an apparatus for inspecting the bottom of a ship without the necessity of dry-docking the ship. The apparatus includes a generally U-shaped framework which is adapted to be submerged for receiving the width of the ship therebetween. A series of cameras are mounted in a spaced relationship along the framework to view vertically upward. A series of lights are mounted in a spaced relationship along the framework at an acute angle to vertical, and are directed generally toward the viewing area of the cameras so that backscattering is minimized while the ship bottom discontinuities are made evident by shadow effects. With such an arrangement the ship can be driven through the apparatus or the apparatus can be moved relative to the bottom of the ship while a series of photographs are taken by the cameras. By proper photographing a mosiac can be pieced together to provide a view of the entire bottom of the ship. This can be studied in detail to ascertain whether there is any crack which might result in a structural failure.

OBJECTS OF THE INVENTION

An object of the present invention is to provide an apparatus for inspecting the bottom of a ship without the necessity of dry-docking.

Another object is to provide an apparatus for efficiently photographing the entire bottom of a ship while the ship is in the water.

A further object of the invention is to provide an apparatus which will photograph the entire bottom of a ship in the water with a minimum of backscattering and a highlighting of bottom discontinuities.

Still another object is to provide an apparatus which can perform the functions of the immediately preceding object, but yet can be selectively positioned at varying distances from the ship's bottom.

These and other objects of the invention will become more readily apparent from the ensuing specification taken together with the drawings.

DESCRIPTION OF THE PREFERRED EMBODIMENT

Figure 1:
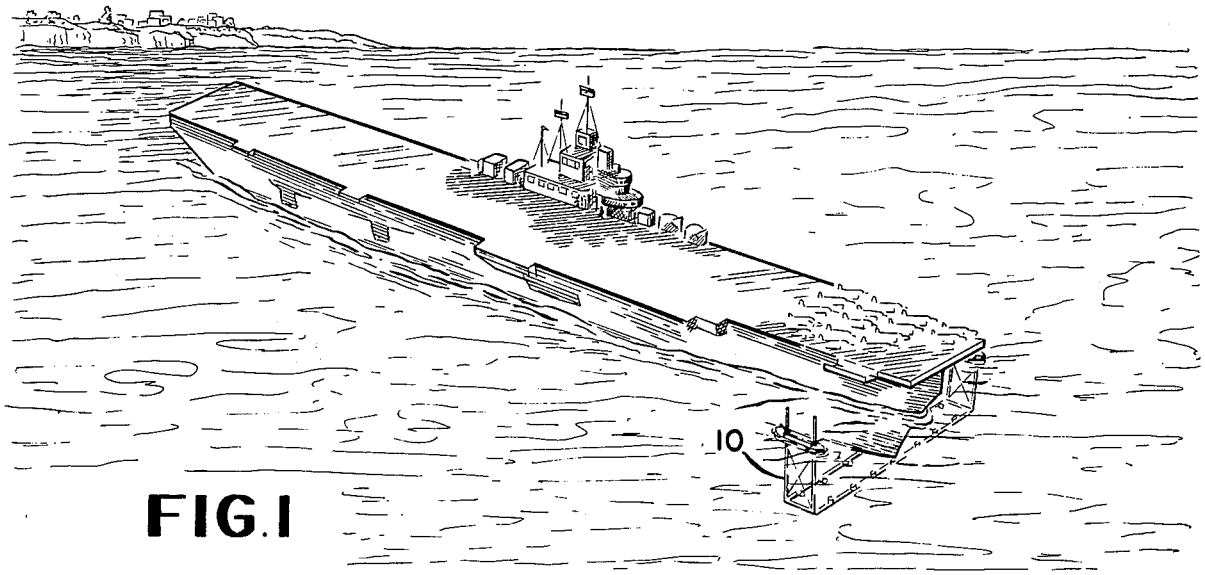
FIG. 1 is an isometric view of a large ship passing through the ship's bottom inspection apparatus.
Figure 2:
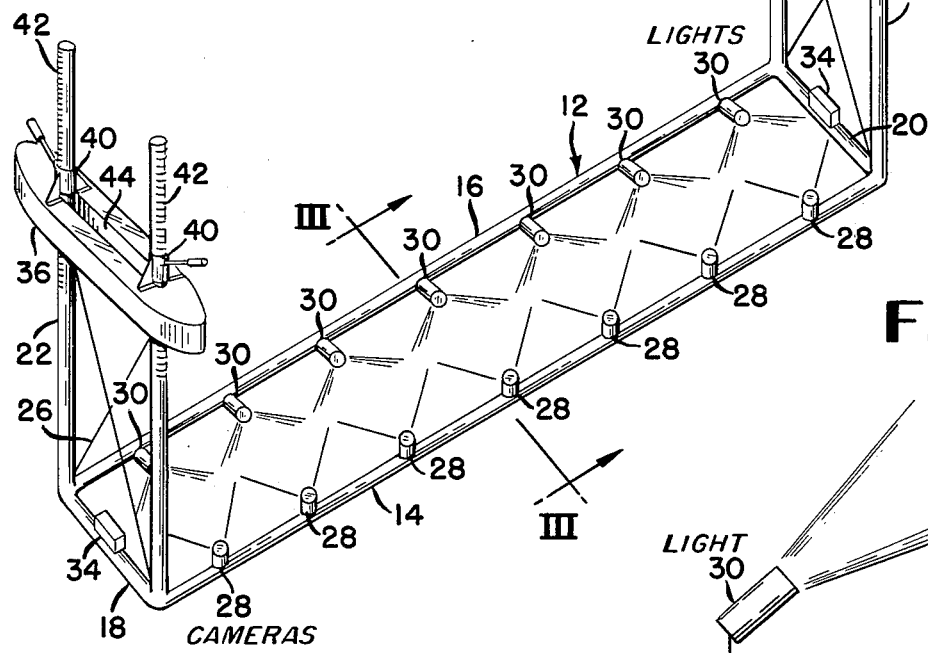
FIG. 2 is an isometric illustration of the ship's bottom inspection apparatus removed from the water.

Referring now to the drawing wherein like reference numerals designate like or similar parts throughout the several views, there is illustrated in FIG. 1 a large ship which is being driven slowly through the ship's bottom inspection apparatus 10. Alternately, the ship can be maintained stationary while the inspection apparatus 10 is moved along the ship's bottom. The inspection apparatus may include a framework 12 which is adapted to be submerged for receiving the width of the ship therebetween. As illustrated in FIG. 2, the framework 12 may include a pair of generally U-shaped frames 14 and 16 which are joined together in a spaced apart lateral relationship by cross members 18 and 20. The upstanding portions of the frames 14 and 16 form in combination with the cross members 18 and 20 a pair of spaced apart U-frames 22 and 24. The U-shaped frames 22 and 24 may be strengthened laterally with tension cables 26, and the bottom of the framework between the frames 14 and 16 may be strengthened in a similar matter (not shown).

Figure 3:
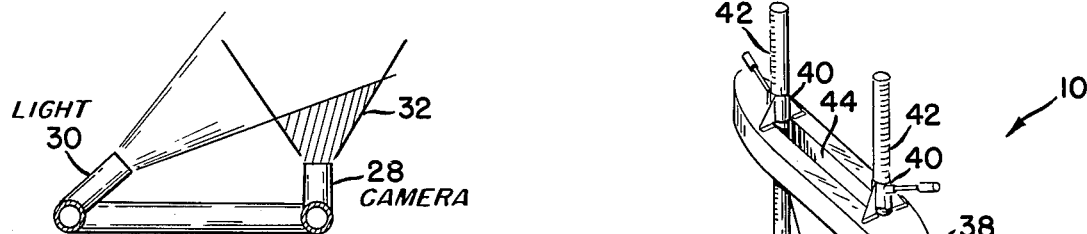
FIG. 3 is a view taken along plane III—III of FIG. 2.

As illustrated in FIG. 2, a series of cameras 28 may be mounted in a spaced relationship along the bottom of one of the frames 14 to view vertically upward. Further, a series of lights 30 may be mounted in a spaced relationship along the other frame 16 at an acute angle to vertical and toward the viewing area of the cameras 28. In this manner backscattering is minimized while discontinuities of the ship's bottom are made evident by shadow effects. This advantage is illustrated in FIG. 3 where it can be seen that backscattering is eliminated in the slightly shaded area 32 while the angle of the light toward the bottom of the ship will cause irregularities in the bottom to cast a shadow which can be viewed by the camera 28. It is desirable that the cameras 28 and the lights 30 be spaced so that the entire width of the ship's bottom can be photographed as the ship passes therethrough.

Figure 4:
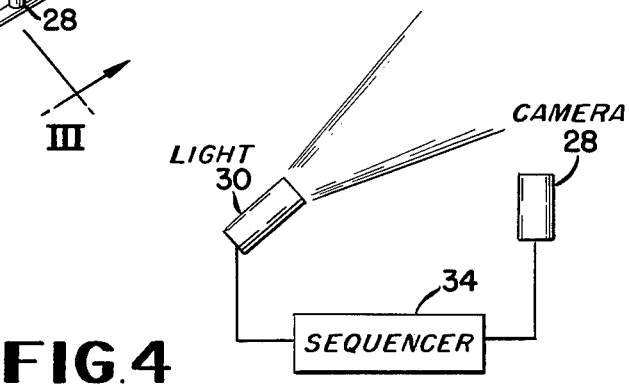
FIG. 4 is a schematic illustration of a device for sequencing the lights and cameras as desired.

In order to provide a mosiac of the bottom of the ship the cameras 28 must be repeatedly operated as the ship passes through the apparatus 10. As illustrated in FIG. 4, this may be accomplished by a sequencer 34 which is connected to each of the cameras 28. The sequencer 34 is adjusted to operate according to the rate of travel of the ship through the apparatus 10 so that complete photographic coverage is obtained. It is also desirable that the lights 30 be strobe lights, in which case the sequencer would also operate these lights according to the same pattern, but ensuring that the cameras 28 are opened slightly ahead of and slightly after the operation of these lights. The resulting film from the cameras 28 will then enable the arrangement of a mosiac of the entire bottom of the ship for inspection purposes.

When the draft of a ship exceeds 15 feet it is desirable that the inspection apparatus 10 be capable of being raised and lowered to maintain a fixed stand off distance between the cameras 28 and the bottom of the ship. This has been accomplished by providing a pair of floats 36 and 38 for slidably receiving the upstanding members of the end frames 22 and 24. Means for elevating or lowering the framework 12 through these floats may include a jack 40 which operates on a ratchet 42 on each respective upstanding member of the frames 22 and 24. The floats 36 and 38 may be slotted at 44 so that the tension cables 26 can pass therethrough during the elevating and lowering process. The jacks 40 can be operated manually or can be powered and operated remotely as desired. The framework 12 can be constructed so that little weight is imposed during the elevating and lowering process by constructing the frames 14 and 16 of tubular members. In this manner, the entire framework 12 with the cameras 28 and the lights 30 can be made to be slightly negatively buoyant.

Obviously, many modifications and variations of the present invention are possible in the light of the above teachings, and, it is therefore understood that within the scope of the disclosed inventive concept, the invention may be practiced otherwise than specifically described.

What is claimed is:

1. An apparatus for inspecting the bottom of a ship while the ship is moving forward in a body of water comprising:
    a generally U-shaped framework which is adapted to be suspended in the water for receiving the width of the ship therethrough;
    a series of cameras mounted in a spaced relationship along the framework to view vertically upward; and
    a series of lights mounted in a spaced relationship along the framework at an acute angle to vertical and directed generally toward the viewing area of the cameras so that backscattering is minimized while ship bottom discontinuities are made evident by shadow effects;
    whereby multiple photographs can be taken of the ships bottom to display structural defects.

2. An inspection apparatus as claimed in claim 1 including:
    said lights being a series of strobe lights; and
    means adjustable to the relative speed of the ship and the framework for sequencing the operation of the cameras with the strobe lights so that photographs from the cameras can be arranged in a mosaic of the ship's bottom.

3. An inspection apparatus as claimed in claim 1 including:
    buoyancy means for varying the depth of the framework so that the cameras can be adjusted to a desired distance from the ship's bottom.

4. An inspection apparatus as claimed in claim 3 including:
    the buoyancy means comprising said framework extending through a pair of floats; and
    means for elevating or lowering the framework through said floats.

5. An inspection apparatus as claimed in claim 1 including:
    said framework being a pair of generally U-shaped frames which are joined together in a spaced apart lateral relationship; and
    the lights being mounted along the bottom of one of the frames and the cameras being mounted along the bottom of the other frame.

6. An apparatus as claimed in claim 5 including:
    buoyancy means for varying the depth of the framework so that the cameras can be adjusted to a desired distance from the ship's bottom.

7. An apparatus as claimed in claim 6 including:
    the buoyancy means comprising said framework extending through a pair of floats; and
    means for elevating or lowering the framework through said floats.

8. An apparatus as claimed in claim 7 including:
    said lights being a series of strobe lights; and
    means adjustable to the relative speed of the ship and the framework for sequencing the operation of the cameras with the strobe lights so that photographs from the cameras can be arranged in a mosaic of the ships bottom.

9. An apparatus as claimed in claim 1 including:
    buoyancy means mounted on each upstanding portion of the U-shaped framework for positioning the cameras at a desired distance from the ship's bottom as the ship is received through the framework.

10. An apparatus as claimed in claim 9 including:
    said buoyancy means also being adjustable for varying the depth of the framework with respect to the ship's bottom.

* * * * *